United States Patent

Paulonis et al.

[11] Patent Number: 5,115,114
[45] Date of Patent: May 19, 1992

[54] CERAMIC FIBER ATTACHING SYSTEM FOR A BACKING PLATE

[75] Inventors: George J. Paulonis, Hudson, Ohio; David R. Dunlap, Claremore, Okla.

[73] Assignee: ELTECH Systems Corporation, Boca Raton, Fla.

[21] Appl. No.: 514,449

[22] Filed: Apr. 25, 1990

[51] Int. Cl.⁵ .................................................. B23K 9/00
[52] U.S. Cl. ........................................... 219/99; 219/98
[58] Field of Search ......................................... 219/98, 99

[56] References Cited

U.S. PATENT DOCUMENTS

| | | | |
|---|---|---|---|
| 3,702,024 | 11/1972 | Baker, Jr. | 219/99 |
| 3,706,870 | 12/1972 | Sauder et al. | 219/98 |
| 3,819,468 | 6/1974 | Sauder et al. | 161/152 |
| 3,940,244 | 2/1976 | Sauder et al. | 432/247 |
| 4,032,742 | 6/1977 | Kendrick et al. | 219/99 |
| 4,411,621 | 10/1983 | Miller | 432/247 |

FOREIGN PATENT DOCUMENTS

| | | | |
|---|---|---|---|
| 2175007 | 10/1973 | France | 219/99 |
| 58-135776 | 8/1983 | Japan | 219/98 |

Primary Examiner—Clifford C. Shaw
Attorney, Agent, or Firm—John J. Freer

[57] ABSTRACT

An attaching assembly is disclosed which permits attachment of ceramic fiber to a back plate. The assembly includes a stud retainer plate having a perforation, such as at the center of the plate. The stud retainer plate can be affixed to a perforate backing element, e.g., a metal mesh. On the side of the stud retainer plate opposite the backing element, there is a tube retainer. This tube retainer is secured to the stud retainer plate. An elongated, removable tube can be inserted into the tube retainer. A stud can be inserted through the removal tube, and through the retainer plate perforation and perforate backing element. The stud is then welded to a back plate, e.g., a solid furnace wall. A refractory element inserted in the retainer plate perforation insulates the stud from the retainer plate to prevent arcing during welding. After welding, the removable tube, which during welding is surrounded by ceramic fiber, is removed, thereby providing a continuous ceramic fiber hot face covering the attachment assembly.

33 Claims, 2 Drawing Sheets

CERAMIC FIBER ATTACHING SYSTEM FOR A BACKING PLATE

BACKGROUND OF THE INVENTION

Ceramic fiber, often in module form and typically used as insulation components, such as in furnace linings, can have advantages of compressibility and flexibility over more rigid structure. Modules, also sometimes referred to as mats, can be provided as U-shaped structures. For example, in U.S. Pat. No. 4,411,621 U-shaped mats of ceramic fiber insulating material have been shown supported on an expanded sheet metal backing member. As shown most particularly in the figures of the patent, the U-shaped mats may be fastened such as by wire ties to the expanded sheet metal backing member.

It has been taught that there can be prepared fiber mats having the fiber in parallel strip form, and these mats can be assembled for attachment to a furnace wall. U.S. Patent No. 3,819,468 discloses a ceramic fiber mat having a central stud, with the stud tip inside a ceramic ring, serving as an arc shield. The stud tip can be welded to a furnace wall to secure the fiber mat to the wall. The method and apparatus for this stud welding has been more particularly detailed in U.S. Patent No. 3,706,870.

In U.S. Pat. No. 3,940,244, a related arrangement is used. A stud assembly allows for a stud to be welded for attaching a ceramic fiber module to a wall, but there is also used a metal grid backing member between the wall and the fiber. An arcuate-shaped washer can be locked into the metal grid over a ceramic ferrule. By using a threaded stud, a nut may be employed on the stud to lock the washer in place.

In a still further related U.S. Pat. No. 4,032,742, the washer does not lock into a metal grid. But a mat on a threaded stud is still utilized for maintaining the washer in pressing contact against an arc shield, i.e., a ceramic ferrule.

It would nevertheless be desirable to provide fiber insulation which could be easily fastened such as to solid backing plates. Such units should lend themselves to ease of replacement, as during repair of an insulated structure. It would also be desirable if the units could lend themselves to being readily fastened and repaired using equipment that is conventionally available.

SUMMARY OF THE INVENTION

A ceramic fiber attachment system has now been provided which meets the foregoing objectives. The system lends itself to ease of ceramic fiber installation, such as at the outset of preparing a furnace wall, or during subsequent wall replacement or repair, where in either case the wall comprises a solid backing plate. The system is simplistic, lending itself to ease of installation without the use of special tools. Moreover, after installation the fiber will be readily and fully supported. After installation, only the ceramic fiber is exposed to heat, i.e., the fiber will protect the support structure used from a direct heat path. Furthermore, even if heat induced fiber shrinkage is encountered, such will not expose the support structure to direct heat.

Broadly, the present invention is directed to an attachment assembly for attaching ceramic fiber to a back plate, which assembly comprises an at least substantially flat, plate-like stud retainer member having an at least substantially centrally located perforation, with there being an electrically non-conductive, hollow refractory element affixed to the stud retainer member within the perforation, and a tube retainer member having a section of cylindrical shape, such tube retainer member being positioned essentially on top of the plate-like stud retainer member, with the section of cylindrical shape being at least substantially centered above the stud retainer member perforation.

In other aspects, the invention is directed to a plate-like stud retainer of novel configuration as well as a tube retainer for securing to such stud retainer. In yet another aspect, the invention is directed to a method of attaching ceramic fiber to a back plate, such as a solid furnace wall.

DESCRIPTION OF THE PREFERRED EMBODIMENTS

As used herein, the terms "mat" and "blanket" are interchangeable and refer to accumulated ceramic fiber insulation in other than loose form. The ceramic fiber mat or blanket can originate in a form of finite length, e.g., strip form, and from such form may be folded into a desirable insulation configuration. The ceramic fiber useful in the present invention can be any of such material as may be used as insulation material and lends itself to preparation in a blanket or mat form having resilient characteristic, e,g., ease of folding without deleterious breaking or rupturing of the fiber strip. Typical such ceramic fiber materials are the alumina-silica refractory fibers capable of withstanding exposure to elevated furnace temperature. The blanket will be useful in any installation where thermal insulation with such fiber is serviceable. Typical applications will include furnace chamber walls, roofs and doors. Ceramic fiber as is installed in accordance with the present invention is also contemplated for use in repair, e.g., for installation in existing ceramic fiber insulation assemblies.

Figure 1:
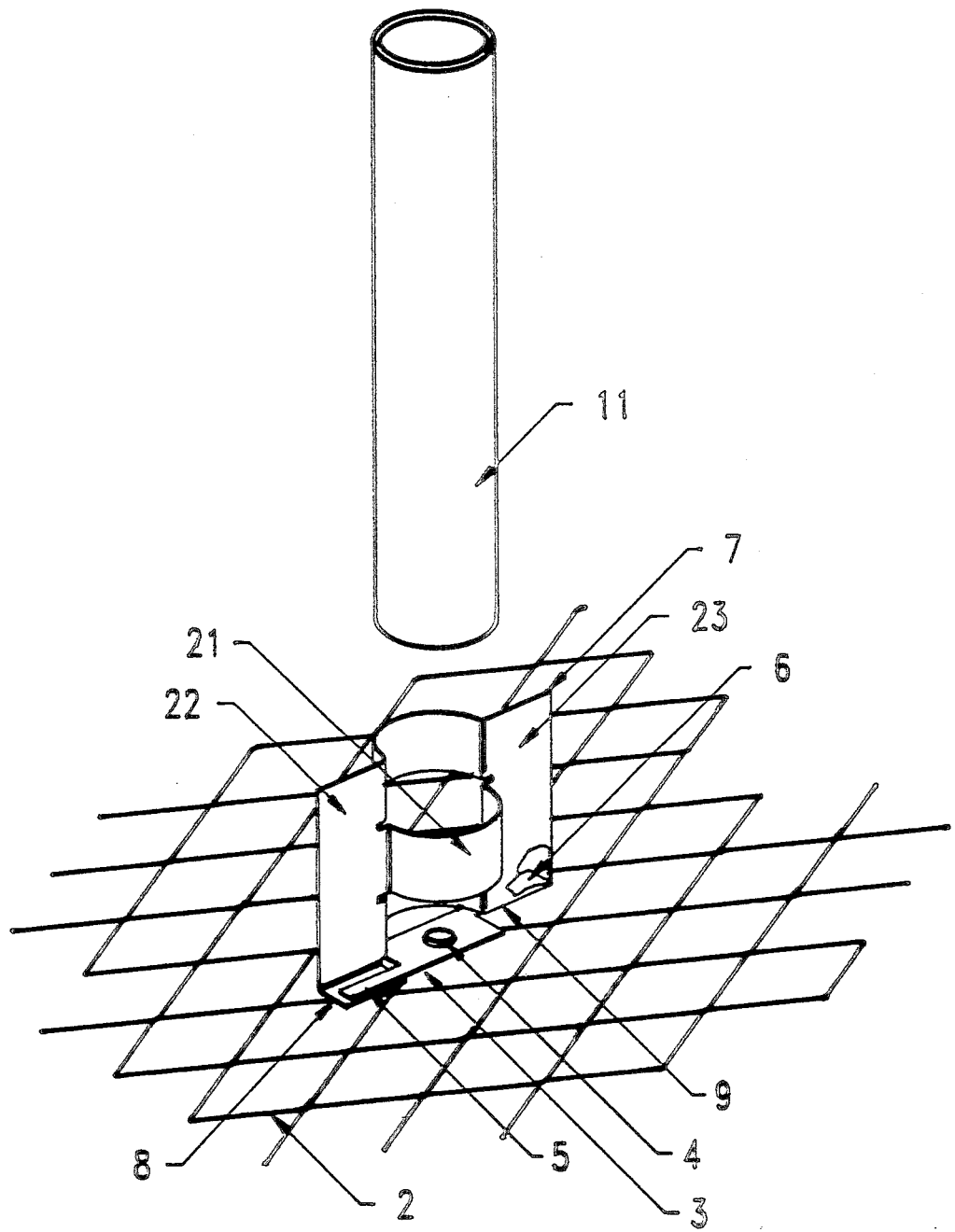
FIG. 1 is a perspective view of an attachment assembly utilizing a mesh backing and showing an elongated, removable tube in exploded view.

Referring to FIG. 1, a backing element 2, in perforate, e.g., mesh, form, has secured thereto a flat, generally plate-like stud retainer 3. The stud retainer 3 has a perforation 4 therethrough and, at opposite corners of a main plate section of rectangular shape, this stud retainer has sideways extending flanges 5,6. These flanges 5,6 are in the same plane as the main plate section. The flanges 5,6 are parallel to each other, but at opposite corners of the main plate section whereby they are unaligned, one with the other. Such arrangement can add stability to the overall attachment assembly. Atop the stud retainer 3 is a tube retainer 7 comprising a cylindrically-shaped center section 21 with side flaps 22,23. The cylindrically-shaped center section 21 is centered at least substantially over the perforation 4 of the stud retainer. The center section 21 is composed of three half-loops, one atop another, but with adjacent half loops extending in opposite directions. It is contemplated that as few as two, or more than three, half-loops will be serviceable.

The side flaps 22,23 of the tube retainer 7 extend radially outwardly from the center section 21, for a distance, or width of the side flaps, at least substantially equal to the diameter of the center section 21. These side flaps 22,23 are parallel to the axis of the center section 21, and are spaced apart 180° around such center section 21. For the tube retainer 7 depicted in the figure, the side flaps have height equal to the height of the center section 21. At its base, the side flap 22 folds at 90° into flange 8; likewise, the side flap 23 folds 90° at its base into a similar flange 9 (under the stud retainer flange 6). These tube retainer flanges 8,9 extend in opposing directions for facing attachment, as by welding, to the stud retainer flanges 5,6, thereby forming combined flange pairs 5,8 and 6,9.

An elongated, hollow, electrically non-conductive and removable tube member 11 is depicted ready for placement into the center section 21 of the tube retainer 7. In use, the tube retainer 7 and stud retainer 3 will be surrounded by ceramic fiber insulation, not shown, which insulation can also cover the backing element 2. This insulation may be in the form of U-shaped blankets and these blankets may be fastened to the backing member 2, as by using wire ties such as in the manner described in U.S. Pat. No. 4,411,621.

Figure 2:
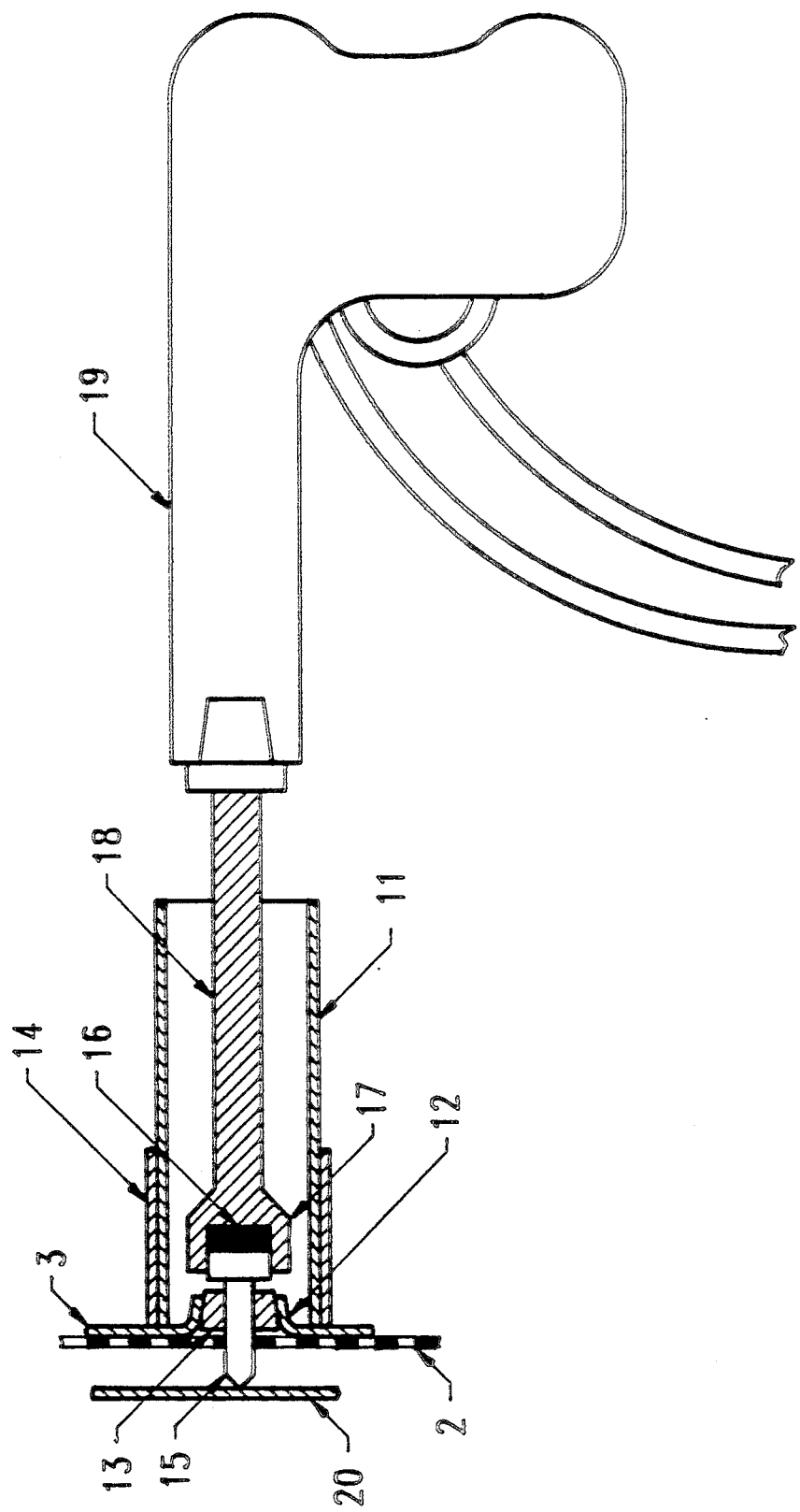
FIG. 2 is a side view of an attaching assembly, with stud ready for welding.

Referring then to FIG. 2, a stud retainer 3 is connected, by means not shown, to a perforate backing element 2. This backing element 2 is adjacent a back plate 20. Around the perforation of the stud retainer 3, there is a protruding lip, or indentation 12. This lip 12 flares away from the back plate 20. Inserted within this lip 12 is an electrically non-conductive and refractory element 13. There is affixed to the stud retainer 3 a short, cylindrically shaped, hollow tube retainer 14, which might be, for example, like the tube retainer 7 of FIG. 1, but excluding the side flaps 22,23. Within the hollow tube retainer 14, is an electrically non-conductive elongate and hollow removable tube member 11. The removable tube member 11 and hollow metal tube retainer 14 are surrounded by ceramic fiber insulation, not shown. Inserted through the stud retainer protruding lip 12, and thus through the refractory element 13, is a stud 15. The stud 15 is held, by means of a magnet 16, in the chuck 17 at the end of a connector 18 to a stud gun 19.

Referring still to the figures, the backing element 2, in addition to the metal mesh shown in FIG. 1, may be in other perforate form, e.g., a grid of metal strips. Then the back plate 20 is at least virtually always imperforate, e.g., a solid wall or shell of a furnace. Although the stud retainer flanges 5,6 are preferably welded to the tube retainer flanges 8,9 and these tube retainer flanges 8,9 are welded to the perforate backing element 2, the stud retainer 3 itself can be firmly affixed to the backing element 2 by metallurgical means, e.g., brazing or welding. Or the stud retainer 3 may be otherwise affixed to the backing element 2 such as by mechanical means including bolting or wire tying. As more particularly shown in FIG. 1, the stud retainer 3 can be a main plate section with side flanges 5,6. Alternatively, any useful plate-like shape may be utilized, e.g., circular but generally rectangular, with a perforation 4. This perforation 4 will generally be circular, although other shapes are contemplated and for any shape will usually be at least substantially centrally located in the stud retainer 3. In addition to the flanges 5,6 at opposite corners of the center plate, the stud retainer may have other flanges, e.g., extending from all corners, or extending perpendicular to the positioning of the corner flanges 5,6. Some to all of these flanges may be secured, e.g., welded to the backing element. The stud retainer 3, plus flanges, will most always be a unified, solid article, excepting for said perforation 4, made of any economical and readily available metal such as nickel, steel, stainless steel, or titanium.

The perforation 4 within the stud retainer 3 can have a lip 12 (FIG. 2) that may be flared outwardly away from the back plate 20. This assists in accommodating the placement of the hollow refractory element 13, e.g., a ceramic collar, which can be inserted within the lip 12 on at least one side of the stud retainer 3, but preferably for best insulation extends completely through the perforation 4. This refractory element 13 will outwardly take the shape of the perforation 4, e.g., circular or hexagonal or the like, but will virtually always have a cylindrical central aperture. This refractory element 13, which may be made of mullite or corderite or other non-electrically conductive refractory material, can be firmly affixed to the stud retainer 3 as by a fast-setting and waterproof caulk or sealant. Suitable caulks or sealants include the commercially available hot melt adhesives usually available in stick form for hot glue guns. The electrically non-conductive refractory element 13 serves as an insulator to insulate the stud 15 from the stud retainer 3 to prevent arcing during fastening of the stud 15 to the back plate 20.

The assembly atop the stud retainer 3 will preferably be the more highly configured member such as the tube retainer 7 of FIG. 1, but may be the more simplistic hollow, but generally otherwise solid, tube retainer 14 of FIG. 2. The tube retainer 7 can have the centrally located cylindrically-shaped section 21, as shown in FIG. 1, or it can be a solid cylinder, such as the tube retainer 14 of FIG. 2. The tube retainer side flaps 22,23 can have shorter or longer width than depicted in FIG. 1 and may also be shorter or greater in height than the center section 21. Moreover, the side flaps 22,23 may terminate in a pair of flanges, each bent 90° at the base of the side flaps 22,23. In any configuration, the tube retainer 7,14 should be metallic so as to be easily fastened, such as adhesively fastened as by hot gluing, or preferably metallurgically fastened as by brazing or welding, to the stud retainer 3. Useful metals for this tube retainer 7,14 are steel, and preferably stainless steel, although the use of other metals such as nickel and titanium are contemplated.

Inserted within the hollow tube retainer 7,14, is then a more elongate and hollow, removable tube 11. This longer tube member 11 is electrically non-conductive so that the stud gun connector 18 is electrically insulated from the tube retainer 7,14. The longer tube 11 may be made of a material such as ceramic or plastic (polymeric), but is preferably for economy simply wood or cardboard. Although the tube retainers 7,14 and removable tube 11 are all shown circular in cross-section, or have portions that are so, it is to be understood that other configurations, e.g., square or triangular may be utilized. Also, although the elements in general as depicted in the figures are generally imperforate, it is contemplated that some of these elements may be perforate, e.g., perforate side flaps 22,23 for the tube retainer 7. The studs 15 as will be useful are any of those as are serviceable in stud welding, e.g., carbon steel studs.

Preferably for ease of fastening, the stud retainer 3 and tube retainer 7 are configured as depicted in FIG. 1. In this configuration, the stud retainer flanges 5,6 extend over the tube retainer flanges 8,9, providing for ease of, for example, spot welding each flange pair together. The arrangement of the stud retainer flanges 5,6 atop the tube retainer flanges 8,9 as shown in FIG. 1 is also preferred. In this arrangement, the tube retainer flanges 8,9 are stud welded to the back plate 20. It is however to be understood that other flange arrangement could be made, such as tube retainer flange 8 atop stud retainer flange 5, and/or the same arrangement for the other flange pair.

In assembly, preferably a stud retainer 3 is fastened to a tube retainer 7,14, then this resulting assembly can be fastened to the backing element 2. The refractory element 13 will be secured within the perforation 4 of the stud retainer 3 prior to the stud retainer 3 being secured to the backing element 2. The removable tube member 11, e.g., cardboard tubes, can then be inserted in the tube retainers 7,14. When these are in place on the backing element 2, ceramic fiber insulation, typically in blanket form, will then be affixed to, and cover, the backing element 2. Generally, this fiber insulation will be secured such as in the manner described hereinbefore, e.g., by wire ties, to a metal mesh serving as a backing element 2. The removable tube members 11 are selected to be of sufficient length so as to have at least their outer rim exposed through the ceramic fiber insulation after the installation is in place on the backing element 2. Thus when the ceramic fiber insulation is being installed, at least the outer rims of the tube members 11 remain visible at the hot face of the insulation. Then, as shown more particularly in FIG. 2, stud welding can serve to affix the entire ceramic fiber insulation to the backing element 2. The elongate tube members 11 are then removed, leaving a hot face of only ceramic fiber with no exposed fastening elements.

It will be appreciated that both the stud retainer 3 and the tube retainer 7,14 can be readily manufactured, e.g., as by metal stamping. Then, their particular configuration leads to ease of assembly, as by spot welding flange pairs together. Furthermore, at this point the stud retainer/tube retainer preassembly may be readily spot welded to the perforate backing element 2. Thus, there is combined ease of manufacture of the assembly with ease of installation, as more particularly depicted in FIG. 2.

We claim:

1. An attachment assembly for attaching ceramic fiber to a back plate, which assembly comprises:

an at least substantially flat, plate-like stud retainer member having an at least substantially centrally located perforation, with there being an electrically non-conductive, hollow refractory element affixed to said stud retainer member within said perforation; and a tube retainer member having a center section of cylindrical shape with two side flaps extending radially outwardly from said center section, said tube retainer member being positioned essentially on top of said plate-like stud retainer member, with said center section of cylindrical shape being at least substantially centered above said stud retainer member perforation.

2. The attachment assembly of claim 1, wherein said stud retainer member has a main flat, plate-like central section of at least substantially rectangular shape.

3. The attachment assembly of claim 2, wherein said rectangular central section has flat, sideways extending flanges that extend in the same plane as said central section.

4. The attachment assembly of claim 3, wherein said rectangular central section has at least two sideways extending flanges, that are positioned parallel to each other, but from opposite corners of said central section in opposite direction so as not to be in direct alignment with each other.

5. The attachment assembly of claim 4, wherein said extending flanges lie flat against flanges extending in opposite directions from the base of said tube retainer member, thereby forming combined flange pairs.

6. The attachment assembly of claim 5, wherein said combined flange pairs are metallurgically secured together.

7. The attachment assembly of claim 1, wherein said stud retainer perforation is circular and comprises a peripheral lip flaring outwardly away from said back plate.

8. The attachment assembly of claim 1, wherein said stud retainer member, excepting said perforation, is a solid metal retainer.

9. The attachment assembly of claim 1, wherein said assembly also comprises a perforate backing element and said stud retainer member is secured by one or more of mechanical or metallurgical means to said perforate backing element.

10. The attachment assembly of claim 9, wherein said perforate backing element is a metal mesh and said stud retainer is secured by metallurgical means of welding or brazing to said metal mesh.

11. The attachment assembly of claim 1, wherein said refractory element is a hollow and cylindrical, ceramic element and said ceramic element is adhesively secured within the perforation of said stud retainer.

12. The attachment assembly of claim 1, wherein said center section comprises at least two half-loops atop one another, but with adjacent half-loops extending in opposite directions.

13. The attachment assembly of claim 1, wherein said side flaps are positioned opposite one another, 180° around said center section, extending outwardly therefrom a width dimensioned at least substantially the diameter of said cylindrical center section.

14. The attachment assembly of claim 1, wherein said side flaps have height at least substantially equal to the height of said center section and each side flap has at least one flange extending from its base.

15. The attachment assembly of claim 14, wherein each side flap is bent at its base at least substantially about 90° to thereby provide an extending flange.

16. The attachment assembly of claim 1, wherein said tube retainer member is a unitary, stamped metal member.

17. The attachment assembly of claim 1, wherein an elongated and hollow, electrically non-conductive and removable tube is inserted into said tube retainer.

18. In an attachment assembly for attaching ceramic fiber to a backing plate wherein, after attachment, only a ceramic fiber hot face remains, the improvement comprising an at least substantially flat, plate-like stud retainer member having a main flat, plate-like central section of at least substantially rectangular shape, with flat, sideways extending flanges that extend in the same plane as said central section, said stud retainer member having an at least substantially centrally located perforation, an indented lip of said plate retainer around said perforation, and an electrically non-conductive and hollow refractory element secured to said stud retainer within said perforation.

19. The assembly of claim 18, wherein said refractory element is a ceramic collar.

20. The assembly of claim 18, wherein said refractory element is hot glued within said perforation.

21. The assembly of claim 18, wherein a pair of said flanges are parallel but extend from opposite corners of said central section in opposite direction, being thereby not in direct alignment with each other.

22. In an attachment assembly for attaching ceramic fiber to a backing plate wherein, after attachment, only a ceramic fiber hot face remains, the improvement comprising a tube retainer for said assembly, said tube retainer having a cylindrically-shaped center section, a first side flap extending radially outwardly from said center section, a second side flap positioned 180° around said center section from said first side flap and extending radially outwardly from said center section, said side flaps being positioned along said center section in a plane parallel to the axis of said section, with each side flap having at its base at least one flange angled at least substantially perpendicularly to the side flap, with the resulting flanges extending in opposite directions, one to the other.

23. The attachment assembly of claim 22, wherein said center section comprises at least two half-loops atop one another, but with adjacent half-loops extending in opposite directions.

24. The attachment assembly of claim 22, wherein said side flaps extend radially outwardly a width dimensioned at least substantially the diameter of said cylindrical center section.

25. The attachment assembly of claim 22, wherein said side flaps have height at least substantially equal to the height of said center section and each side flap has at least one flange extending from its base.

26. The attachment assembly of claim 22, wherein each side flap is bent 90° at its base to thereby provide said flange.

27. The attachment assembly of claim 22, wherein said tube retainer is a unitary, stamped metal member.

28. An attachment assembly for attaching ceramic fiber to a back plate, which assembly comprises:
   a perforate backing element;
   a planar stud retainer member having a centrally located perforation, said member comprising a rectangular center section with at least a pair of parallel flanges extending sideways therefrom, but at opposite corners of said center section so as not to be in alignment with each other;
   a hollow and cylindrical refractory element secured within the perforation of said stud retainer member; and
   a tube retainer member having a central section of cylindrical shape, said tube retainer member being secured to said stud retainer member by means of flanges of said tube retainer member, which are secured to said flanges of said stud retainer member, with said tube retainer member central section of cylindrical shape being centered above the perforation of said stud retainer member.

29. The attachment assembly of claim 28, wherein flanges of said assembly are secured by metallurgical means of welding or brazing to said perforate backing element.

30. The attachment assembly of claim 28, wherein said ceramic element is adhesively secured within the perforation of said stud retainer member.

31. The attachment assembly of claim 28, wherein an elongated and hollow, electrically non-conductive and removable tube is inserted into said tube retainer member.

32. The method of attaching insulating fiber to a back plate, which method comprises:
   (a) securing a combination of a stud retainer member, which has an at least substantially centrally located perforation, plus a tube retainer member to a perforate backing member, and with there being held in said tube retainer member an elongated and hollow electrically non-conductive and removable tube extending away from said perforate backing member;
   (b) enveloping said stud retainer member plus tube retainer member combination in insulating fiber so as to leave exposed the outermost end of said removable tube;
   (c) inserting a stud through said removable tube, as well as through the perforation of said stud retainer member and the perforate backing member, and into contact with said back plate;
   (d) welding said stud to said back plate; and
   (e) removing said removable tube.

33. The method of claim 22, wherein said stud retainer member plus tube retainer member combination is secured to said perforate backing member by welding.

* * * * *